(12) United States Patent
Blanford et al.

(10) Patent No.: US 6,220,513 B1
(45) Date of Patent: Apr. 24, 2001

(54) METHODS AND APPARATUS FOR DETERMINING BAR CODE LABEL LOCATION INFORMATION

(75) Inventors: Denis M. Blanford, Duluth; Paul O. Detwiler; Barry M. Mergenthaler, both of Lawrenceville; Hong Tang, Suwanee, all of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/001,367

(22) Filed: Dec. 31, 1997

(51) Int. Cl.$^7$ ................................................ G06F 19/00
(52) U.S. Cl. ............................ 235/462.15; 235/462.01; 235/472.01; 235/474; 235/477
(58) Field of Search ............. 235/462.01, 462.36–462.4, 235/462.15, 472.01–472.03, 474, 476, 477

(56) References Cited

U.S. PATENT DOCUMENTS

| | | | |
|---|---|---|---|
| 4,825,058 | * | 4/1989 | Poland ................................. 235/472 |
| 4,831,610 | * | 5/1989 | Hoda et al. ............................ 369/48 |
| 5,005,086 | * | 4/1991 | Iwamoto et al. ..................... 358/227 |
| 5,028,770 | * | 7/1991 | Miyaszaki et al. ............ 235/462.01 |
| 5,258,699 | * | 11/1993 | Grodevant ............................ 318/685 |

* cited by examiner

Primary Examiner—Thien M. Le
Assistant Examiner—Daniel S Felten
(74) Attorney, Agent, or Firm—Peter H. Priest

(57) ABSTRACT

A system for synchronization of the angular position of a rotating optical assembly in a bar code scanner having a rotating optical assembly. The optical assembly is rotated by a motor which produces a fixed number of pulses per rotation, the pulses occurring at equal intervals such that each pulse indicates a degree of angular rotation of the motor. The pulses are continuously monitored and counted. Timing is simultaneously monitored. A synchronization label is placed in the scanner such that light directed through the rotating optical assembly will strike the synchronization label and be reflected back to the rotating optical assembly when the rotating optical assembly is at a particular angular position, thus establishing an initial angular position of the rotating optical assembly. Once the initial angular position is established, timing is continuously monitored and pulses are continuously monitored and counted. When an event of interest, such as bar code scan occurs, the pulse count is evaluated and processed to determine an angular position of the rotating optical assembly with respect to the initial position as established at synchronization.

17 Claims, 7 Drawing Sheets

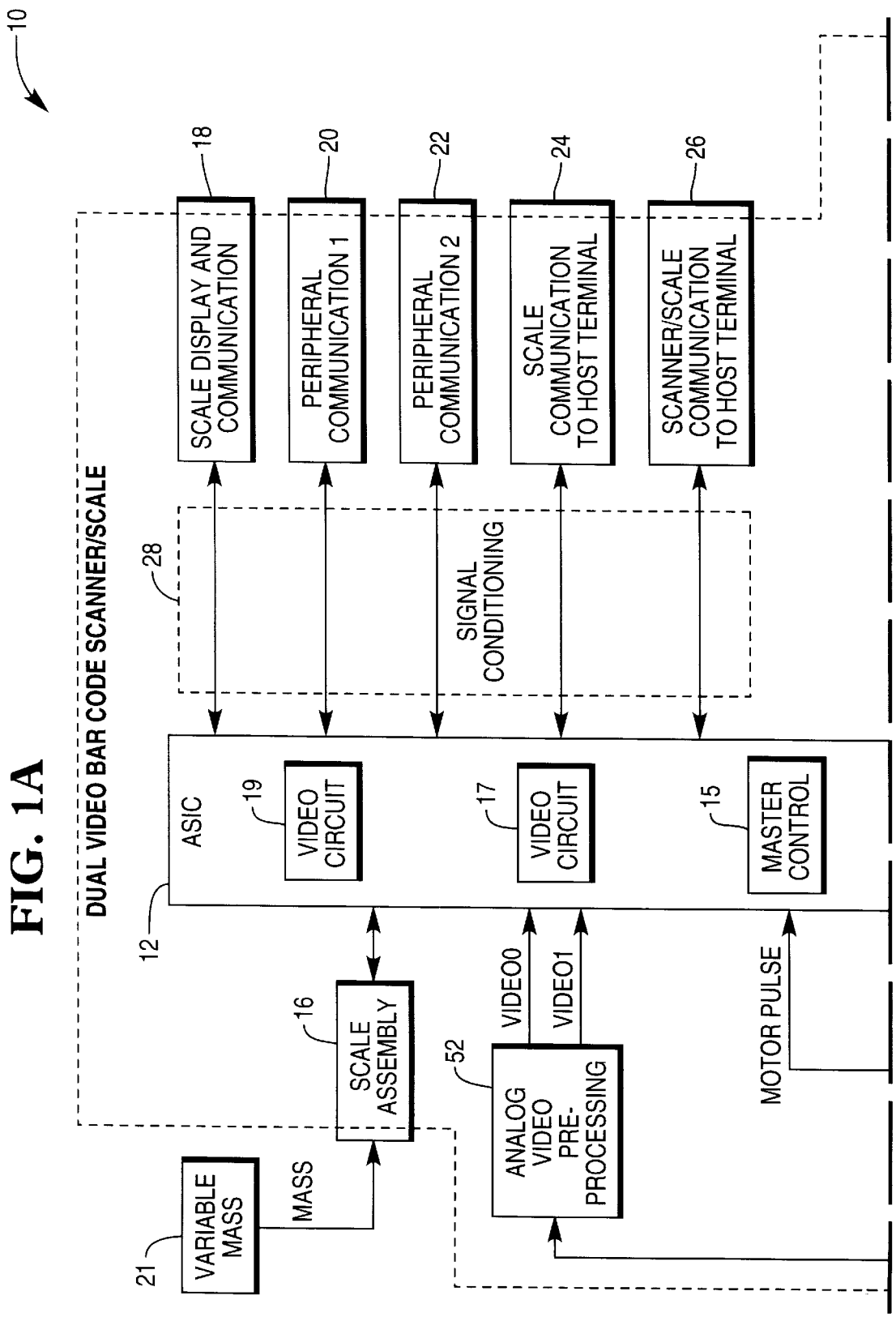

METHODS AND APPARATUS FOR DETERMINING BAR CODE LABEL LOCATION INFORMATION

CROSS REFERENCE TO RELATED APPLICATIONS

The present application makes reference to U.S. application Ser. Nos. 09/001,369, and 09/001,368, entitled "Methods and Apparatus for Enhanced Scanner Operation Employing Bar Code and Bar Code Fragment Time and Position of Data Collection", and "Methods and Apparatus for Dual Channel Video Recovery in Bar Code Scanners", respectively, filed on even date herewith and assigned to the assignee of the present invention. These applications are incorporated by reference herein in their entirety. As discussed in greater detail below, in a presently preferred embodiment of the present invention, the teachings of the present invention are used in conjunction with the teachings of the above referenced applications.

FIELD OF THE INVENTION

The present invention relates generally to improvements in laser bar code scanners. More particularly, the present invention relates to methods and apparatus for synchronization of an angular position of a rotating optical assembly in a bar code scanner, as well as the determination of bar code label and location information.

BACKGROUND OF THE INVENTION

Bar code scanners typically operate by using a motor and pattern mirrors to scan a light beam across a label surface and measuring the reflected light. The light beam is generated by a laser, usually a laser diode, and associated optics. The reflected light returns along the incident path and is focused onto a photodetector. The photodetector converts this collected light energy into an electrical signal. This electrical signal is processed by analog electronics, converted to a digital signal, and further processed by digital electronics, usually including a processor and associated firmware.

The processor receives a stream of label data including whatever has passed within the range of the laser or light beam, including complete and partial data. The processor, under control of programming typically stored in firmware, attempts to piece together partial data or bar code fragments ("partials"), ignore multiple reads of the same item, and perform other tasks. The information received can be ambiguous and otherwise difficult to interpret, for a number of reasons. For example, there may be several items in the scan zone or even several identical items at one time. Typically, the firmware avoids a multiple read problem by requiring a relatively long delay between good reads of identical items. This reduces scanning throughput, and is therefore presently a necessary but undesirable solution.

A better solution would be to provide the processor with knowledge of a label's or partial's location. This would allow the processor to determine, for example, if two recovered labels were on the same or different items. It would also allow for the possibility of improved partial reconstruction, since the processor would be aware that recovered partials were or were not adjacent to each other. Thus, it will be recognized that it will be highly advantageous to provide methods and apparatus for determining bar code label location information as a label is being scanned. A number of issues have hindered progress on collecting such information as discussed below.

SUMMARY OF THE INVENTION

The scan pattern generating characteristics of a particular scanner's optomechanical design are determined by the position and orientation of the laser source and spinner motor, the design of the scanning spinner, and the position and orientation of the various pattern mirrors employed. Given a knowledge of these elements, the scanned laser beam's position and orientation can be calculated as a function of spinner rotation angle and expressed, for example, in terms of the x, y and z coordinates of the intersection of the laser beam and a scan window or entrance to the scan zone and the direction cosines of the laser beam's vector. Thus, given a knowledge of the spinner rotation angle, the scanner firmware can determine the laser origin and direction within the scan zone either through direct calculation or, preferably, through the use of a lookup table. As an example, a lookup table for the NCR 7875, a bioptic scanner with 40 distinct scan lines including top-down coverage, is given in Table 1 found at the end of the present specification. Each set of two rows gives origin and direction values for the beginning and end points of 40 distinct scan lines as a function of spinner rotation angle. Intermediate values can be calculated through linear interpolation.

The spinner rotation angle must be related to time. Typically, the spinner motor will operate at a relatively constant speed. Moreover, the motor position can be tracked by monitoring the output of Hall effect to obtain motor position reference data, other motor shaft position sensors, or other tracking mechanisms. This allows the scanner to track the rotational position of the spinner motor rotor's poles. Unfortunately, it is difficult to mechanically relate these poles to the position of the spinner itself. The spinner can be fixed in a known position relative to the motor poles, but because of the small radii involved, small positioning errors may result in large angular errors.

Therefore, a need exists in the art for a bar code scanner which synchronizes the initial position of a spinner used in a bar code scanner with the position of the motor poles, and which combines knowledge of the initial position of the spinner with knowledge of the rotational angle of the motor poles, to determine the rotational angle of the spinner at a particular time.

A bar code scanner according to one embodiment of the present invention includes a laser for producing light which is reflected from a bar code during a scan. The light is transmitted through an optical assembly including a rotating portion, or spinner, driven by a motor. The direction and location of incidence of the light depends on the angular position of the spinner. Associated with the motor is a Hall effect or other device for producing a motor position indicating pulse or pulses. A pulse indicative of the motor being in a reference position may be used to synch a time count of elapsed time, and time stamp data is provided to a processor for interpretation to determine the angular position of the motor at the time of an occurrence of interest, typically a scan of a bar code.

The bar code scanner further includes a position reference determining mechanism which preferably includes a synchronization label attached to the scanner in a precise position. As the spinner rotates, the synchronization label is struck by one particular known scan line per revolution. As the scanner starts up, the microprocessor looks for the synchronization label, and simultaneously reads the motor pulses. By correlating the elapsed time after a synching motor pulses with the detection of the synchronization label, the bar code scanner can track the angle of deflection of the spinner from the synchronization label, thus providing an accurate angular position of the spinner throughout the operation of the scanner.

A more complete understanding of the present invention, as well as further features and advantages of the invention, will be apparent from the following Detailed Description and the accompanying drawings.

BRIEF DESCRIPTION OF THE DRAWINGS

FIGS. 1a–1b are diagram illustrating a bar code scanner incorporating the use of mirror angle synchronization according to the present invention;

DETAILED DESCRIPTION

Figure 1B:
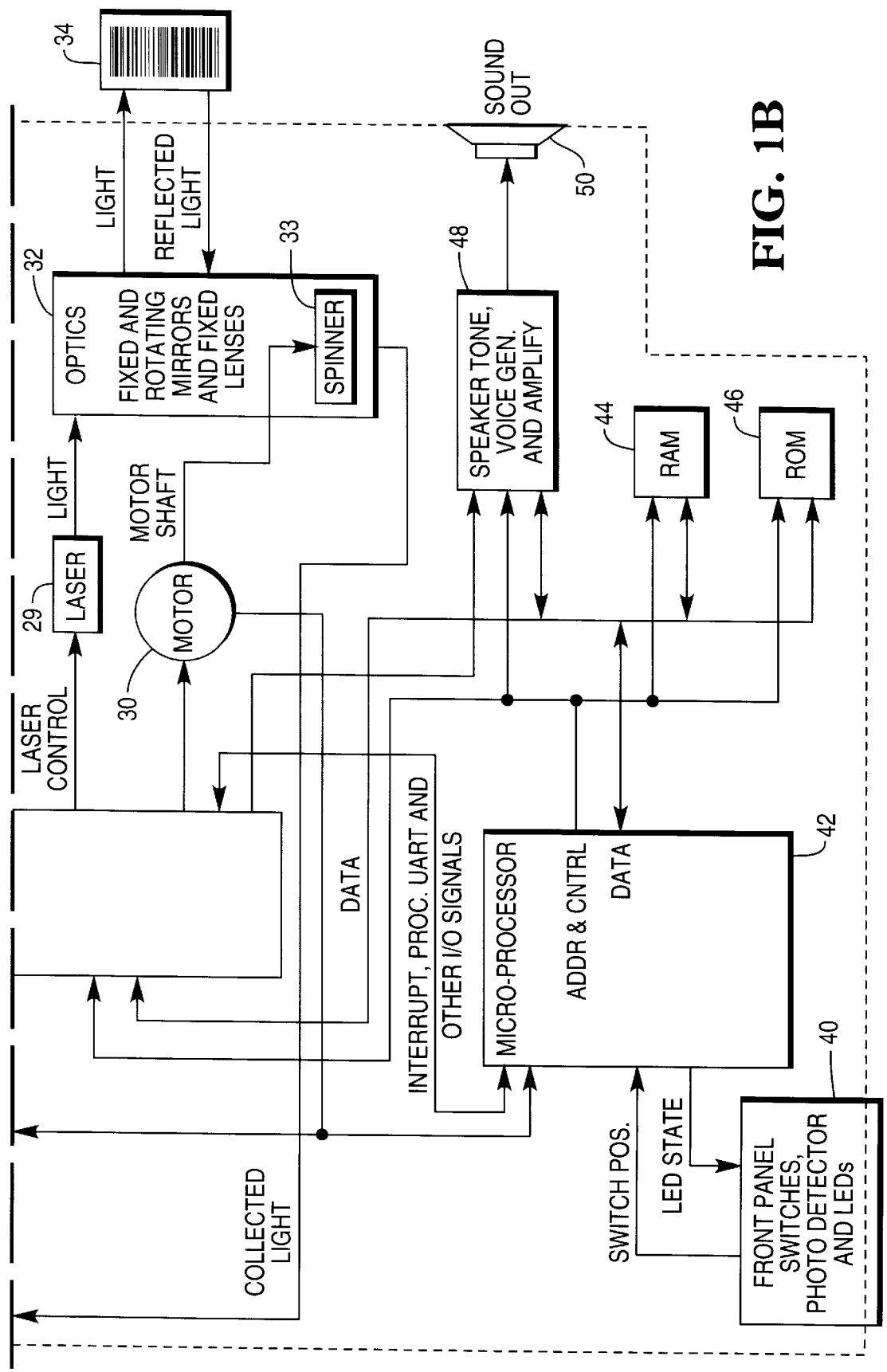

FIG. 1 is a diagram illustrating a bar code scanner 10 incorporating the principles of the present invention. The bar code scanner 10 includes an ASIC 12. ASIC 12 includes master control circuit 15, first video circuit 17 and second video circuit 19, discussed in greater detail in connection with FIGS. 2 and 3 below. The illustrated bar code scanner 10 also includes a scale assembly 16 on which an object such as variable mass 21 may be placed for weighing, scale assembly 16 then supplying weight information to ASIC 12. As indicated above, in a presently preferred embodiment the teachings of the present invention are used in conjunction with those of U.S. application Ser. Nos. 09/001,369 and 09/001,368 entitled "Methods and Apparatus for Enhanced Scanner Operation Employing Bar Code and Bar Code Fragment Time and Position of Data Collection" and "Methods and Apparatus for Dual Channel Video Recovery in Bar Code Scanners" which are incorporated by reference herein in their entirety.

Bar code scanner 10 also preferably includes scale display and communication circuit 18, first peripheral communication circuit 20, second peripheral communication circuit 22, scale communication to host terminal circuit 24, and scanner/scale communication to host terminal circuit 26, each of circuits 18–26 furnishing signals to ASIC 12, the signal from each of circuits 18–26 first passing through line conditioner 28. ASIC 12 also furnishes a laser control signal to a laser 29, and also furnishes commands to a motor 30. The motor 30 includes a motor shaft 30a to which is attached an optical assembly 32. The assembly 32 may suitably include fixed mirrors or other optical components (not shown in detail), mounted so as to rotate on a spinner 33. As the motor 30 is driven in response to signals from the ASIC 12, spinner 33 is moved by motor 30. As light is emitted from laser 29, the light is reflected by assembly 32 to an optical basket which directs the light so as to strike a bar code label 34 whenever the bar code label 34 is present within the scanner's field of view. It is presently preferred that the present invention be used with an NCR model 7875 bi-optic scanner, but it will be recognized that the present invention may be advantageously utilized with a wide variety of scanners for which it is desired to generate bar code label location information.

When light strikes bar code label 34, the light is reflected back to optical assembly 32, collected and passed to an analog video preprocessing circuit 52, which provides VIDEO0 and VIDEO1 signals to ASIC 12.

Bar code scanner 10 also includes a microprocessor 42. Interrupt, Processing, UART and other I/O signals are passed between the ASIC 12 and the microprocessor 42. Bar code scanner 10 further includes input/output package 40, which includes front panel switches, a photodetector and LEDS. The microprocessor 42 can accept settings from the front panel switches by receiving a switch position signal from the input/output package 40. The microprocessor sets the states of the LEDS on the input/output package 40 by transmitting an LED state signal to the input/output package 40.

Bar code scanner 10 also preferably includes capabilities for sound generation, including sound output circuit 48, speaker 50, automatic volume adjustment circuit 36 and microphone 38. Bar code scanner 10 also includes RAM and ROM memory 44 and 46, respectively.

A data bus passes between ASIC 12, microprocessor 42, RAM memory 44, ROM memory 46 and sound output circuit 48. An address and control bus also passes between ASIC 12, microprocessor 42, RAM memory 44, and ROM memory 46.

Bar code reader 10 produces tones and generated voice sounds in order to communicate with the operator and to provide operator feedback. Sound output circuit 48 receives signals from ASIC 12 and microprocessor 42 for instructions on what sounds to generate and when, and accesses data from RAM 44 and ROM 46 for the generation of sounds. The sounds are passed to speaker 50.

The motor 30 drives the spinner 33. The motor preferably includes a Hall effect device, which produces a fixed number of pulses each time the motor is rotated one revolution. The pulses are transmitted to the ASIC 12 and the microprocessor 42 in the form of a motor pulse signal. The ASIC 12 and the microprocessor 42 are able to use the motor pulse signal to begin an accurate count of elapsed time, as the motor 30 turns at a relatively fixed rate once it is up to speed and operating normally.

The motor pulse signal is also used to synchronize a timer included in the processor 42 which indicates the angle of the motor 30 at a particular time. At a suitable time before the beginning of operation of bar code scanner 10, the processor 42 is programmed with information as to the number of pulses of a motor revolution and the pulse edge polarity that is to be used as the reference for the beginning of the scan revolution. The ASIC 12 employs this information to determine the motor angle 30, as will be described in further detail below.

Figure 2A:
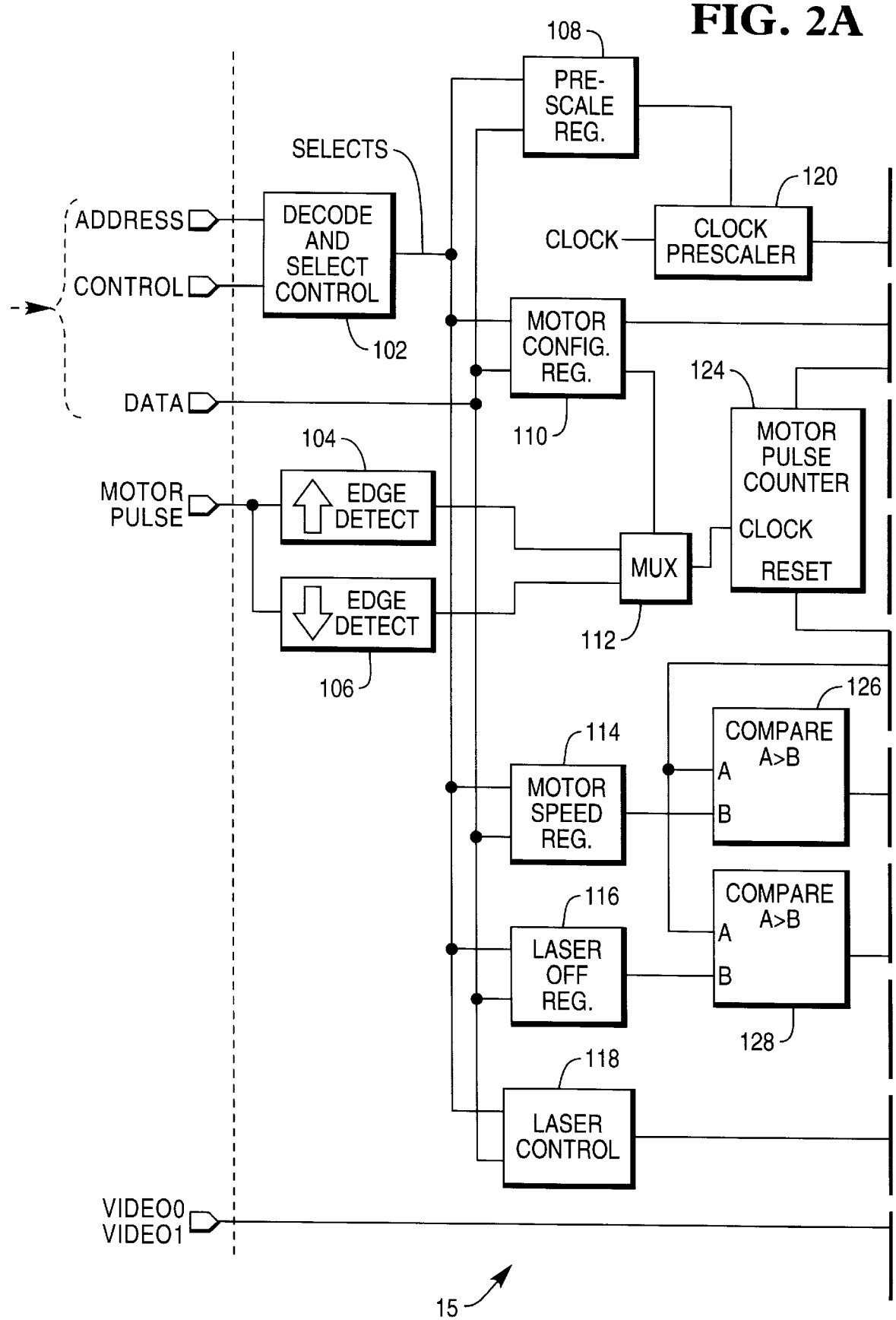
FIGS. 2a–2b are diagram illustrating a control and data position acquisition circuit according to the present invention for controlling a bar code scanner and obtaining timing and mirror angle data, and synchronizing the initial mirror angle, according to the present invention.
Figure 2B:
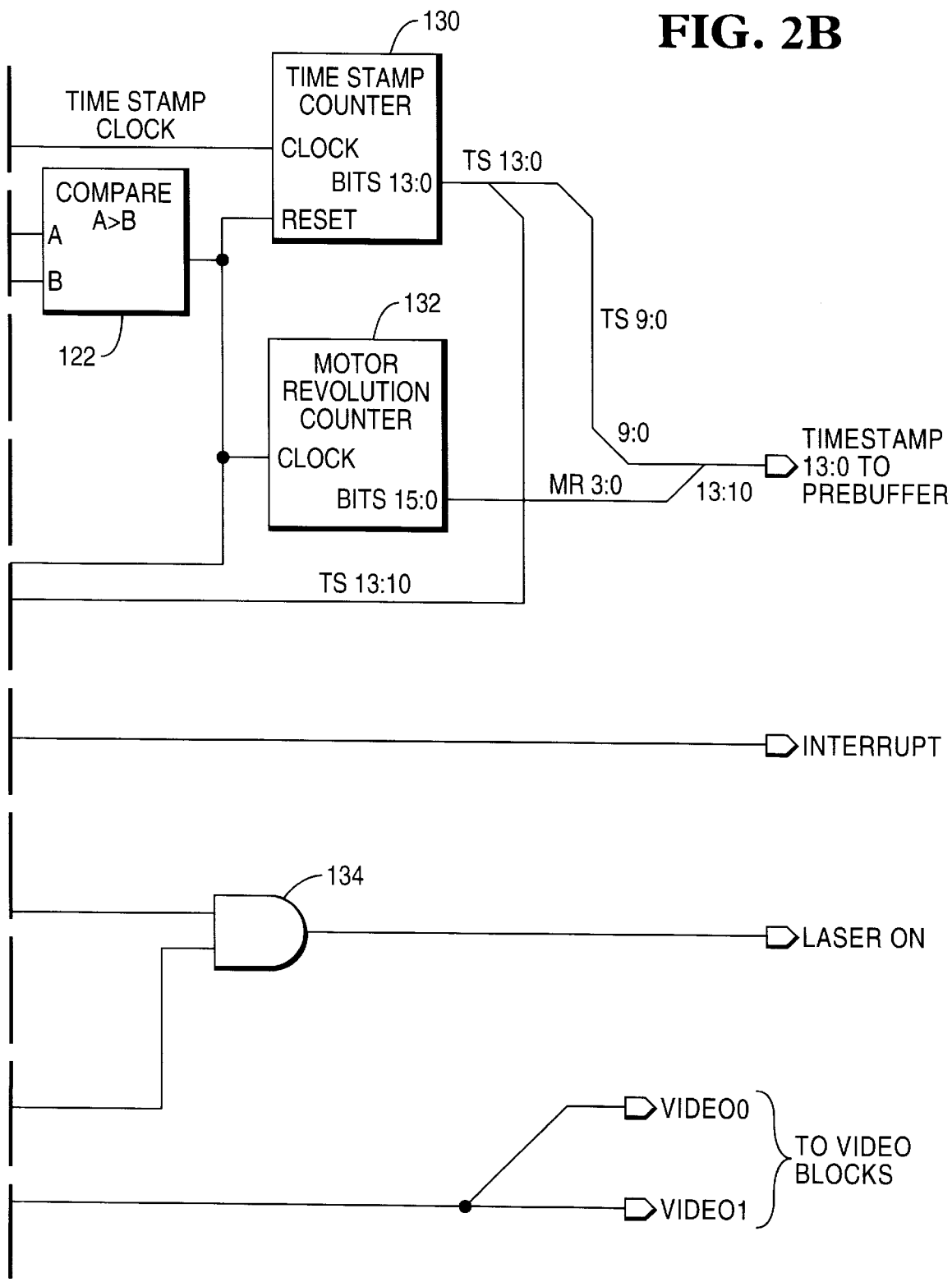

FIG. 2 is a diagram illustrating the master control circuit 15, included in ASIC 12, in greater detail. Master control 15 includes a decode and select control circuit 102, and leading edge detect and trailing edge detect circuits 104 and 106, respectively. Master control 15 also includes a pre-scale register 108, a motor configuration register 110, a multiplexer 112, a motor speed register 114, a laser off register 116, and a laser control circuit 118, which are connected to decode and select control circuit 102, and also to data bus 43.

In typical operation of ASIC 12, master control 15 receives address, control and data inputs from the microprocessor 42. The decode and select control circuit 102 selects one of prescale register 108, motor configuration register 110, motor speed register 114, laser off register 116 and laser control circuit 118 in response to address and control signals from the microprocessor 42. Data is simultaneously placed on data bus 43 by microprocessor 42, and the data is loaded into the selected device.

Master control 15 also includes a time stamp clock 130 which generates a 14-bit time stamp value. The time stamp clock 130 is controlled by a clock prescaler 120. The clock prescaler receives a constant clock input, and the rate at which the clock prescaler produces output is controlled by a value stored in the pre-scale register 102. The pre-scale value is set such that the maximum value of bits 0–9 of the time stamp value is just greater than the time for a full revolution of motor 30 when it is turning at a predetermined minimum speed. The clock prescaler supplies a clock input to a time stamp counter 130, so that the clock of time stamp counter 130 is activated each time the clock prescaler increments. Time stamp counter 130 produces a the signal TS, which is supplied to the A input of a motor speed comparator 126. Motor speed comparator 126 is an A>B comparator, and receives as its B input, data from motor speed register 114 indicating a first predetermined minimum allowable speed of motor 30. When the motor rotates at less than this minimum allowed speed, the value TS exceeds the value stored in motor speed register, and, therefore, the A input of comparator 126 exceeds its B input. Comparator 126 then produces an interrupt signal to the microprocessor 42 which can respond to this condition.

Signal TS is also supplied as the A input of laser comparator 128, an A<B comparator which also receives as its B input data from laser off register 116 indicating a second predetermined minimum, the minimum allowable speed for motor 30 at which the laser 29 will be allowed to operate. The output of laser comparator 128 is supplied to AND gate 134, which also receives an input from laser control 118. AND gate 134 provides a laser ON signal, controlling whether the laser 29 is on or off. Thus, the laser 29 can only operate when laser control 118 commands the laser 29 to be ON, and when signal TS indicates that the speed of motor 30 is above the second predetermined minimum. When the speed of motor 30 is too slow, the A input of laser comparator 128 exceeds the B input, the output of laser comparator 128 goes LOW, causing AND gate 134 to go LOW, and the laser on signal to likewise go LOW, causing laser 29 to turn OFF.

The motor configuration register 110 stores data indicating the number of pulses per revolution and the polarity of the edge to synch on. The edge to synch on information in provided to multiplexer 112 which multiplexes the proper edge detect signal from detector 104 or 106 to time stamp counter 130. Pulse comparator 122 receives the number of pulses per revolution and supplies a reset input to clock motor pulse counter 124 and to time stamp counter 130, and a clock input to motor revolution counter 132.

As motor 30 rotates, a motor pulse signal is sent to ASIC 12, which receives it at leading and trailing edge detectors 104 and 106, respectively. Leading and trailing edge detectors 104 and 106 each produce an output which is supplied to multiplexer 112. Multiplexer 112 then supplies an output which is provided to a clock motor pulse counter 124. Clock motor pulse counter 124 counts the input received from multiplexer 112 and supplies the count to pulse comparator 122. Pulse comparator 122, as noted above, also receives an input from motor configuration register 110, the input from motor configuration register 110 indicating the number of pulses in a full revolution. When the count produced by clock motor pulse counter 124 equals the value stored in motor configuration register 110, pulse comparator produces a pulse, which resets time stamp counter 130 and clock motor pulse counter 124, and increments the clock of motor revolution counter 132. Motor revolution counter 132 provides a signal MR, which combines with the signal TS from clock time stamp counter to produce the Time Stamp count, whose use is further described below in connection with the discussion of FIG. 3.

Figure 3:
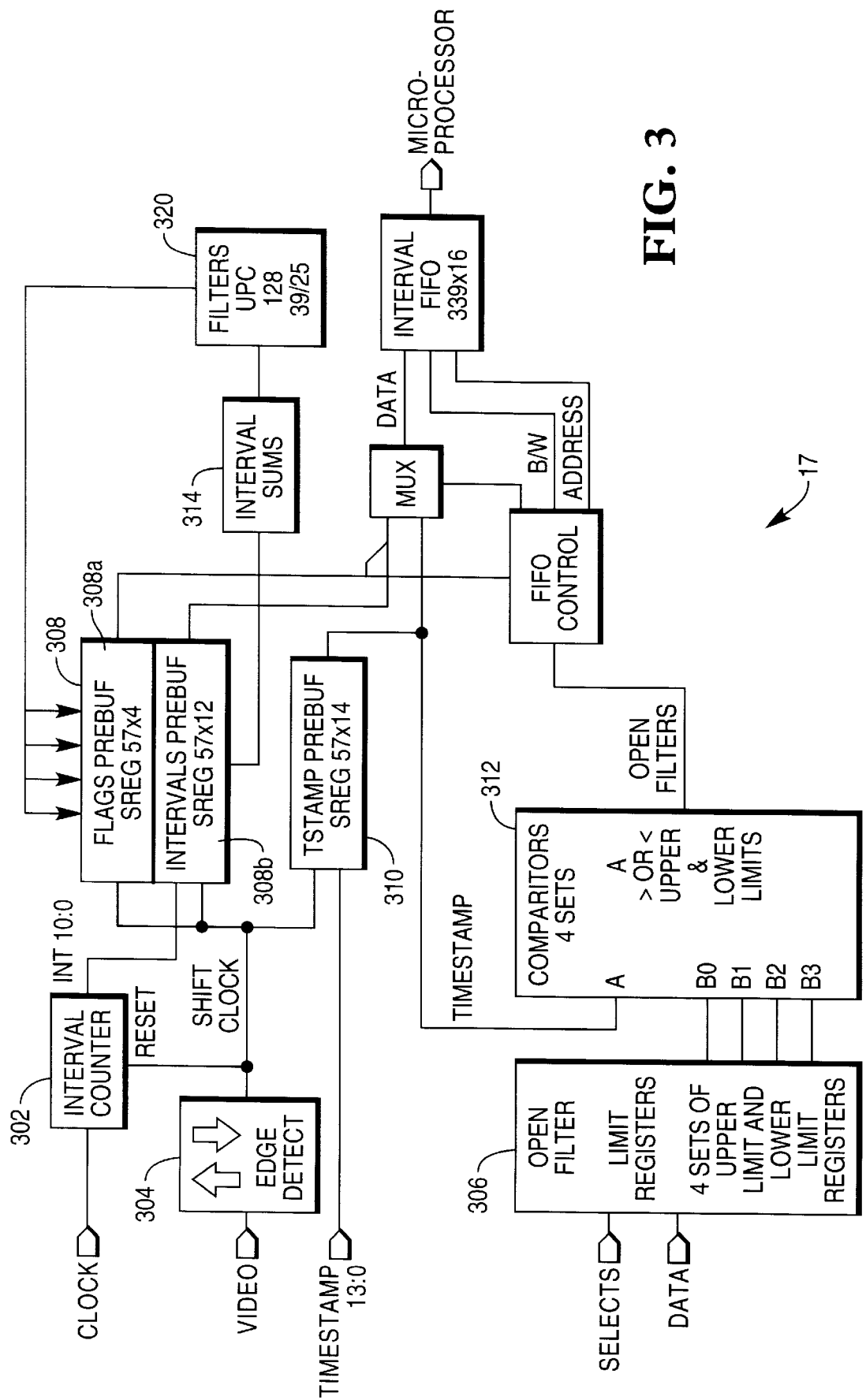
FIG. 3 is a diagram illustrating a video circuit used to obtain mirror angle data in a bar code scanner and synchronize the initial position of the mirror, according to the present invention.

FIG. 3 is a diagram illustrating the first video circuit 17 in greater detail. First video circuit 17 is similar to and operates in parallel with the second video circuit 19, which for the sake of simplicity will not be described in detail.

First video circuit 17 includes interval counter 302, edge detector 304, open filter limit register circuit 306 and prebuffer 308. The prebuffer 308 including flags prebuffer 308a and intervals prebuffer shift register 308b. First video circuit 17 further includes Tstamp prebuffer shift register 310, comparator circuit 312, interval summs 314, FIFO control circuit 316, multiplexer 318, UPC filter 320 and Interval FIFO circuit 322.

First video circuit 17 receives a video input, which is routed into the edge detector 304. Edge detector 304 produces a shift clock output which is supplied to flags prebuffer shift register 308a and Tstamp prebuffer shift register 310. The shift clock output is also supplied to interval counter 302 as a reset input. Edge detector 304 causes interval counter 302 to be started on a video transition, a 12-bit signal INT which represents value and video polarity of the interval. The signal INT is shifted into the intervals prebuffer shift register on the next transition of the video signal, which also resets intervals counter 302, thus starting the timing of the next interval. These intervals represent the time interval or, effectively the width, of the bars and spaces making up a bar code being scanned.

At the same time, the Timestamp signal, which represents the 10-bit Time Stamp and the 4 least significant bits of the motor revolution counter 132 are shifted into the time stamp prebuffer shift register 310. Thus, the time duration of each video interval, the polarity and the time relationship to the motor position is captured for each video transition.

The video intervals are also sent through interval sum 314 and filter circuit 320, which determine if the video data stream meets predetermined timing relationships to indicate that the video data stream represents valid bar code data. For example, if the time interval between the beginning and end of the video data is too long, the data did not come from a valid scan of a bar code, and will be rejected. Similarly, if the time interval between a start and stop character of a bar code is too short, the scan will likewise be rejected. The beginning and end of legitimate bar code data are marked by setting flag bits in the flags prebuffer shift register 308a. The flag bits are then added to the corresponding interval data word stored in intervals prebuffer shift register 308b. The flags are used by the FIFO control 316 to determine which intervals are to be written into the interval FIFO 332, which buffers the interval data for microprocessor 42. When a beginning of block interval is written into interval FIFO circuit 322, the corresponding Time Stamp value is also written into interval FIFO circuit 322 preceding the interval data word. This is done by passing the Time Stamp signal from Tstamp prebuffer shift register 310 and the output of intervals prebuffer shift register 308 into multiplexer 318, which operates under control of FIFO control circuit 316 to control whether the Time Stamp or interval data is selectively written into a comparator 312. The Time Stamp value is also sent to comparator 312, where the signal is compared with the contents of the registers in open filter limit register circuit 306.

Open filter limit register circuit 306 includes four sets of open filter limit registers in which microprocessor 42 may load time values for comparison with the time stamp values received from the time stamp prebuffer. Microprocessor 42, in analyzing the interval data read from interval FIFO 322, may determine that more intervals than are being allowed by digital filter set 320, are required to properly decode the bar code data. Microprocessor 42 then computes the time values for adjacent laser scan beams, and loads these limits in one or more of the open filter limit registers in open filter limit register circuit 306. The contents of the registers in open filter limit register 306 are fed to comparator circuit 312, for comparison to the Timestamp signal. When the Timestamp signal is within the time limits received from the open filter limit register circuit 306, comparator circuit 312 sends an open filters signal to FIFO control 316, causing FIFO control 316 to allow all the following intervals to be written into the internal FIFO 322 so long as this open filters signal is being provided. This signal will override starting or ending flag condition signals from the flags prebuffer 308a.

As shown in FIG. 2, ASIC 12 also includes second video circuit 19, which operates in parallel with first video block 17. The video signals VIDEO0 and VIDEO1 provided to video circuits 17 and 19 may have advantageously been filtered and thresholded with different filters and thresholds in analog video processor 52. The received video signals may thus be captured with differently conditioned analog circuitry. Proper choice of the filtering and thresholding gives a wider coverage to the laser signal reflected from bar code 34.

In order to establish an initial position of spinner 33, the bar code scanner 10 according to the present invention establishes an initial rotational angle of spinner 33. The initial rotational angle is stored in RAM 44. As the microprocessor 41 receives data indicating the rotational angle of motor 30, this data is tracked to determining the angular offset of the spinner from the initial position, from which the rotational angle of spinner 33 is calculated. The rotational angle of spinner 33 can then be used to calculate the origin and direction of light from spinner 33 either through direct calculation or, preferably, through the use of a lookup table such as the table illustrated in Table 1 found at the end of the present specification.

Figure 4:
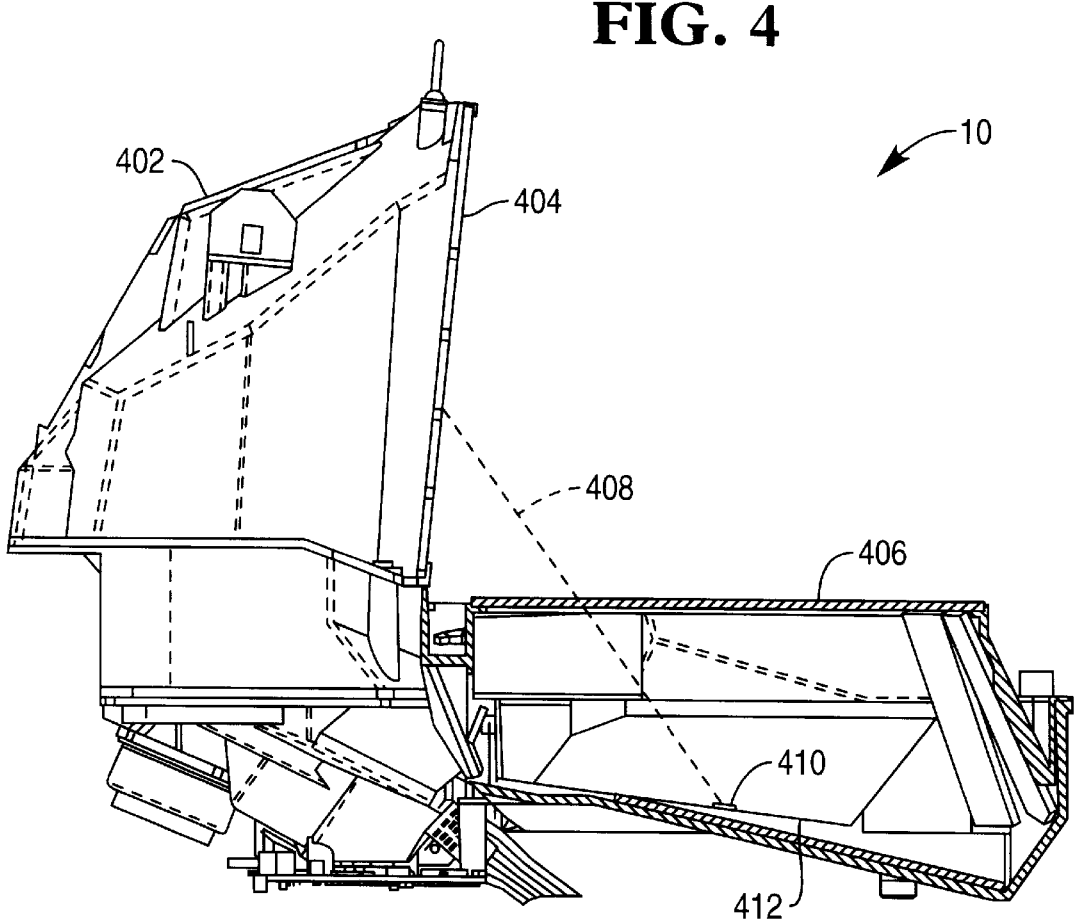
FIG. 4 illustrates a bar code scanner using a synchronization label to obtain an initial mirror position, and motor pulse data to update the mirror position, according to the present invention.

FIG. 4 is a cross-sectional view of the bar code scanner 10. Bar code scanner 10 is preferably a bioptic type scanner with top down read capability, such as the NCR model 7875 scanner. Bar code scanner 10 includes a housing 402 with a substantially vertical aperture 404 and a substantially horizontal aperture 406. The scanner 10 emits an array of scan lines from the vertical aperture 404, of which one line 408 is the focus of the present discussion. For the sake of simplicity, the remaining lines are not shown. Scan line 408 reenters the horizontal aperture 406 and strikes a synchronization label 410 located on the floor 412 of the bar code scanner 10. Being inside the sealed scanner 10, the label 410 is protected from the environment and is not subject to wear. Moreover, when items are inside the scan zone of vertical and horizontal apertures 404 and 406, these items will block the line of sight between laser 34 and synchronization label 410 if passed through this line. Thus, synchronization label 410 will not interfere with normal scanning.

Synchronization label 410 preferably consists of a code 128 fragment including a start character, mod 103, and stop character. During normal operation, as noted above, short scans such as the scan of the synchronization label 410 are rejected by filter 320, thereby reducing processing requirements. However, microprocessor 42 can be programmed to open filter 320 to allow data from the synchronization label 410 to be received and processed, and this is done at the startup of scanner 10 and at other such other times as synchronization needs or is desired to be performed.

During the startup of motor 30, filter 320 is opened and the microprocessor 42 looks for the synchronization label 410 and motor pulses. From this information, and the motor speed, microprocessor 42 calculates the offset between the pulses and the synchronization label 410. Filter 320 is then closed. Since the synchronization label occurs at a known offset from the spinner zero rotation angle which in the case of the NCR 7875 bioptic scanner is approximately 13.2 degrees to the label centerline, the zero rotation angle of spinner 33 can be related to the motor pulse reference position of a particular unit. Any time motor 30 is restarted, the various offset will be recalculated by microprocessor 42. Thus, field replacement of the motor-spinner unit will not cause loss of synchronization.

During normal operation, microprocessor 42 will track the occurrence of bar code data and relate the time at which it occurred to the zero rotation angle of spinner 33. From this information and the lookup table, calculation of the origin and direction of the laser beam at the time of intersection of the label can be performed.

Figure 5:
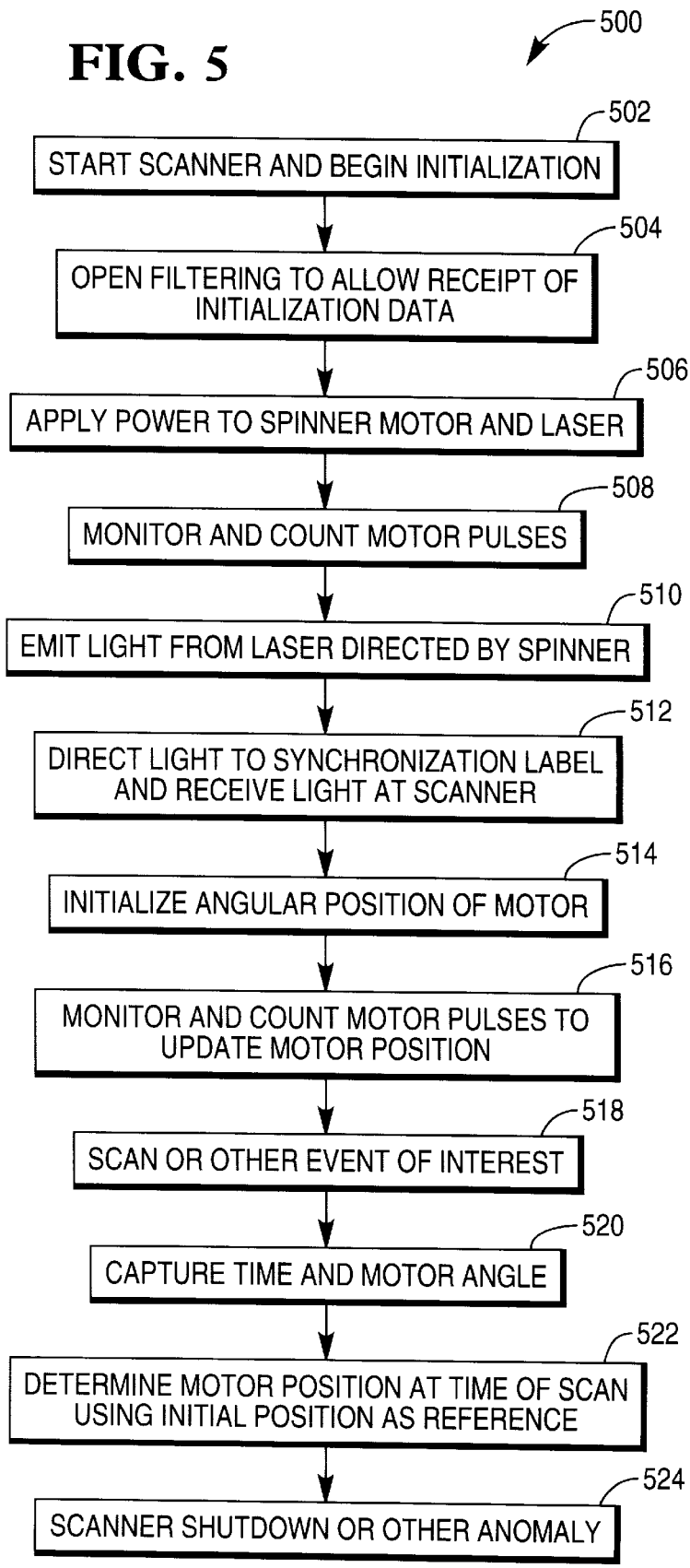
FIG. 5 is a flowchart illustrating a method of synchronizing an initial mirror position in a bar code scanner according to the present invention.

FIG. 5 is a flowchart illustrating a method 500 of synchronizing the initial position of an optical assembly of a bar code scanner, the optical assembly including a rotating portion, or spinner, which directs light from a laser onto a scan field, and directs receives light reflected back from the scan field. At step 502, the bar code scanner is started and initialization is begun. At step 504, filtering is opened to allow receipt of initialization data which is normally rejected during normal operation of the scanner. At step 506, power is applied to the spinner motor and the laser. The motor has an associated pulse producing device which produces pulses at regular intervals, the pulses occurring at equally spaced intervals of angular rotation of the motor when the motor is operating at substantially constant speed. At step 508, the pulses are monitored and counted. At step 510, light is emitted from the laser and directed by the spinner. At step 512, light passes over a synchronization label and is reflected back to and directed by the scanner. The scanner identifies the reflected light as coming from the synchronization label. At step 514, the angular position of the motor is initialized. Because the synchronization label is struck by light from the scanner at a known orientation of the spinner, the initial angular position of the spinner is now precisely known. At step 516, pulses from the motor are monitored and counted, and the angular position of the motor is continuously updated. The updated angular position of the motor is determined with respect to the initial position of the spinner to give precise information about the position of the spinner. The time is also continuously updated at this step.

At step 518, a scan or other event of interest occurs, and at 520, the time and motor angle position is captured. At step 522, the motor angle position is compared with the motor angle position at the initial position of the spinner, with the initial position of the spinner used as a reference to provide a precise spinner position at the event of interest. Steps 518–522 are repeated until an anomaly is detected at step 524, such as the scanner being shut down. Alternatively, resynchronization may be performed at predetermined intervals.

While the present invention is disclosed in the context of a presently preferred embodiment, it will be recognized that a wide variety of implementations may be employed by persons of ordinary skill in the art consistent with the above discussion and the claims which follow below. In the presently preferred embodiment, a lookup table, such as Table 1 below may be suitably employed.

TABLE 1

| Rotation Angle | Time @ 8000 rpm (ms) | Window | Xw | Yw | Zw | I | J | K |
|---|---|---|---|---|---|---|---|---|
| −1.0 | 0.02 | Horizontal | 2.768 | 0.000 | −1.897 | −0.219 | 0.935 | −0.278 |
| −4.8 | 0.100 | Horizontal | 2.279 | 0.000 | 0.924 | −0.252 | 0.959 | −0.126 |
| −4.9 | 0.102 | Horizontal | 1.390 | 0.000 | −1.081 | −0.325 | 0.863 | −0.388 |
| −9.3 | 0.194 | Horizontal | 0.532 | 0.000 | 1.470 | −0.383 | 0.888 | −0.255 |
| −10.0 | 0.208 | Vertical | −3.535 | 1.162 | −3.085 | 0.516 | −0.782 | −0.348 |
| −18.2 | 0.379 | Vertical | −3.307 | 3.427 | 2.395 | 0.614 | −0.783 | −0.093 |
| −20.4 | 0.425 | Vertical | −3.215 | 4.339 | −1.390 | 0.973 | 0.141 | −0.182 |
| −31.6 | 0.658 | Vertical | −3.561 | 0.911 | 3.813 | 0.990 | −0.065 | 0.128 |
| −32.0 | 0.667 | Vertical | −3.126 | 5.231 | 0.190 | 0.679 | −0.647 | −0.348 |
| −39.0 | 0.813 | Vertical | −3.575 | 0.763 | 2.146 | 0.570 | −0.796 | −0.204 |
| −49.0 | 1.021 | Vertical | −3.500 | 1.516 | −1.958 | 0.707 | −0.262 | 0.657 |
| −57.2 | 1.192 | Vertical | −3.048 | 5.999 | −3.029 | 0.778 | −0.004 | 0.628 |
| −59.2 | 1.233 | Horizontal | −2.995 | 0.000 | 1.220 | −0.210 | 0.730 | −0.650 |
| −70.4 | 1.467 | Horizontal | 3.659 | 0.000 | −0.515 | 0.148 | 0.690 | −0.708 |
| −72.0 | 1.500 | Vertical | −3.066 | 5.825 | −2.404 | 0.769 | −0.628 | 0.118 |
| −79.6 | 1.658 | Vertical | −3.158 | 4.906 | 1.924 | 0.696 | −0.624 | 0.354 |
| −80.3 | 1.673 | Horizontal | −1.588 | 0.000 | −0.955 | −0.475 | 0.838 | 0.269 |
| −85.2 | 1.775 | Horizontal | −0.678 | 0.000 | 2.022 | −0.412 | 0.812 | 0.413 |
| −85.3 | 1.777 | Horizontal | 0.329 | 0.000 | −0.484 | −0.349 | 0.926 | 0.146 |
| −89.4 | 1.863 | Horizontal | 0.718 | 0.000 | 2.012 | −0.321 | 0.906 | 0.275 |
| −90.6 | 1.888 | Horizontal | 0.718 | 0.000 | −2.012 | −0.321 | 0.906 | −0.275 |
| −94.7 | 1.973 | Horizontal | 0.329 | 0.000 | 0.484 | −0.349 | 0.926 | −0.146 |
| −94.8 | 1.975 | Horizontal | −0.678 | 0.000 | −2.022 | −0.412 | 0.812 | −0.413 |
| −99.7 | 2.077 | Horizontal | −1.588 | 0.000 | 0.955 | −0.475 | 0.838 | −0.269 |
| −100.4 | 2.092 | Vertical | −3.158 | 4.906 | −1.924 | 0.696 | −0.624 | −0.354 |
| −108.0 | 2.250 | Vertical | −3.066 | 5.825 | 2.404 | 0.769 | −0.628 | −0.118 |
| −109.6 | 2.283 | Horizontal | 3.659 | 0.000 | 0.515 | 0.148 | 0.690 | 0.708 |
| −120.8 | 2.517 | Horizontal | −2.995 | 0.000 | −1.220 | −0.210 | 0.730 | 0.650 |
| −122.8 | 2.558 | Vertical | −3.048 | 5.999 | 3.029 | 0.778 | −0.004 | −0.628 |
| −131.0 | 2.729 | Vertical | −3.500 | 1.516 | 1.958 | 0.707 | −0.262 | −0.657 |
| −142.0 | 2.958 | Vertical | −3.414 | 2.369 | −2.507 | 0.617 | −0.762 | 0.199 |
| −148.4 | 3.092 | Vertical | −3.033 | 6.153 | −0.769 | 0.714 | −0.619 | 0.328 |
| −149.2 | 3.108 | Vertical | −3.468 | 1.830 | −3.823 | 0.992 | −0.009 | −0.128 |
| −161.2 | 3.358 | Vertical | −3.085 | 5.637 | 1.900 | 0.955 | 0.211 | 0.206 |
| −161.6 | 3.367 | Vertical | −3.189 | 4.601 | −2.315 | 0.651 | −0.752 | 0.103 |
| −170.2 | 3.546 | Vertical | −3.395 | 2.558 | 3.229 | 0.548 | −0.749 | 0.372 |
| −170.9 | 3.560 | Horizontal | 1.510 | 0.000 | −1.716 | −0.336 | 0.909 | 0.247 |
| −175.1 | 3.647 | Horizontal | 2.338 | 0.000 | 0.641 | −0.280 | 0.885 | 0.373 |
| −175.1 | 3.648 | Horizontal | 3.200 | 0.000 | −1.170 | −0.203 | 0.972 | 0.114 |
| −179.9 | 3.748 | Horizontal | 3.726 | 0.000 | 1.691 | −0.169 | 0.948 | 0.270 |
| −180.1 | 3.752 | Horizontal | 3.726 | 0.000 | −1.691 | −0.169 | 0.948 | −0.270 |
| −184.9 | 3.852 | Horizontal | 3.200 | 0.000 | 1.170 | −0.203 | 0.972 | −0.114 |
| −185.0 | 3.853 | Horizontal | 2.338 | 0.000 | −0.641 | −0.280 | 0.885 | −0.373 |
| −189.1 | 3.940 | Horizontal | 1.510 | 0.000 | 1.716 | −0.336 | 0.909 | −0.247 |
| −189.8 | 3.954 | Vertical | −3.395 | 2.558 | −3.229 | 0.548 | −0.749 | −0.372 |
| −198.4 | 4.133 | Vertical | −3.189 | 4.801 | 2.315 | 0.651 | −0.752 | −0.103 |
| −198.8 | 4.142 | Vertical | −3.085 | 5.637 | −1.900 | 0.955 | 0.211 | −0.206 |
| −210.8 | 4.392 | Vertical | −3.468 | 1.830 | 3.823 | 0.992 | −0.009 | 0.128 |
| −211.6 | 4.408 | Vertical | −3.033 | 6.153 | 0.769 | 0.714 | −0.619 | −0.328 |
| −218.0 | 4.542 | Vertical | −3.414 | 2.369 | 2.507 | 0.617 | −0.762 | −0.199 |
| −227.2 | 4.733 | Vertical | −3.628 | 0.244 | −0.608 | 0.655 | −0.315 | 0.687 |
| −237.2 | 4.942 | Vertical | −3.050 | 5.981 | −2.040 | 0.749 | −0.005 | 0.662 |
| −240.6 | 5.013 | Horizontal | −2.044 | 0.000 | 2.033 | −0.163 | 0.759 | −0.630 |
| −251.2 | 5.233 | Horizontal | 3.995 | 0.000 | 0.730 | 0.173 | 0.720 | −0.672 |
| −252.2 | 5.254 | Vertical | −3.164 | 4.851 | −2.433 | 0.737 | −0.666 | 0.112 |
| −259.4 | 5.404 | Vertical | −3.265 | 3.845 | 1.739 | 0.669 | −0.664 | 0.333 |
| −260.1 | 5.419 | Horizontal | −2.752 | 0.000 | −0.680 | −0.519 | 0.810 | 0.274 |
| −264.5 | 5.510 | Horizontal | −1.943 | 0.000 | 2.042 | −0.464 | 0.789 | 0.403 |
| −265.4 | 5.529 | Horizontal | −0.701 | 0.000 | −0.227 | −0.398 | 0.905 | 0.156 |
| −269.1 | 5.606 | Horizontal | −0.367 | 0.000 | 2.047 | −0.371 | 0.888 | 0.271 |
| −270.9 | 5.644 | Horizontal | −0.367 | 0.000 | −2.047 | −0.371 | 0.888 | −0.271 |
| −274.6 | 5.721 | Horizontal | −0.701 | 0.000 | 0.227 | −0.396 | 0.905 | −0.156 |
| −275.5 | 5.740 | Horizontal | −1.943 | 0.000 | −2.042 | −0.464 | 0.789 | −0.403 |
| −279.9 | 5.831 | Horizontal | −2.752 | 0.000 | 0.680 | −0.519 | 0.810 | −0.274 |
| −280.6 | 5.846 | Vertical | −3.265 | 3.845 | −1.739 | 0.669 | −0.664 | −0.333 |
| −287.8 | 5.996 | Vertical | −3.164 | 4.851 | 2.433 | 0.737 | −0.666 | −0.112 |
| −288.8 | 6.017 | Horizontal | 3.995 | 0.000 | −0.730 | 0.173 | 0.720 | 0.672 |
| −299.4 | 6.238 | Horizontal | −2.044 | 0.000 | −2.033 | −0.163 | 0.759 | 0.630 |
| −302.8 | 6.308 | Vertical | −3.050 | 5.981 | 2.040 | 0.749 | −0.005 | −0.662 |
| −312.8 | 6.517 | Vertical | −3.628 | 0.244 | 0.608 | 0.655 | −0.315 | −0.687 |
| −321.0 | 6.688 | Vertical | −3.575 | 0.763 | −2.146 | 0.570 | −0.796 | 0.204 |
| −328.0 | 6.833 | Vertical | −3.126 | 5.231 | −0.190 | 0.679 | −0.647 | 0.348 |
| −328.4 | 6.842 | Vertical | −3.561 | 0.911 | −3.813 | 0.990 | −0.065 | −0.128 |
| −339.6 | 7.075 | Vertical | −3.215 | 4.339 | 1.390 | 0.973 | 0.141 | 0.182 |
| −341.6 | 7.121 | Vertical | −3.307 | −3.427 | −2.395 | 0.614 | −0.783 | 0.093 |
| −350.0 | 7.292 | Vertical | −3.535 | 1.162 | 3.085 | 0.516 | −0.782 | 0.348 |
| −350.7 | 7.306 | Horizontal | 0.532 | 0.000 | −1.470 | −0.383 | 0.888 | 0.255 |
| −355.1 | 7.398 | Horizontal | 1.390 | 0.000 | 1.081 | −0.325 | 0.863 | 0.388 |
| −355.2 | 7.400 | Horizontal | 2.279 | 0.000 | −0.924 | −0.252 | 0.959 | 0.126 |
| −359.0 | 7.479 | Horizontal | 2.768 | 0.000 | 1.897 | −0.219 | 0.935 | 0.278 |

Origin lies on top plate and is centered with respect to the overall scanner dimension in both horizontal directions.
The X axis points toward the checker, the Y axis points up, and the z axis points to the checker's left.
Negative rotation angle with positive time.

We claim:

1. A bar code scanner comprising:

a laser;

an optical assembly having a spinner, the optical assembly being operative to conduct light transmitted by the laser and receive light reflected back from a surface;

a motor attached to the spinner, the motor being operative to rotate the optical assembly;

a synchronization label attached to the bar code scanner and fixedly positioned to receive and reflect light from the laser when the spinner is at a predetermined angular position; and a position detector for determining the angular position of the motor at the time of a scan, the position detector being operative to receive video data when light from the synchronization label is received and determine the angular position of the motor at the time the light from the synchronization label is received, the position detector being further operative to determine an angular position of the spinner during operation of the bar code scanner by determining the angular position of the motor at the particular time, determining an angular offset of the motor at the particular time from the angular position of the motor at the time the light from the synchronization label is received, and adding the angular offset to the known angular position of the spinner when the light is received from the synchronization label.

2. The bar code scanner of claim 1 and also including filtering circuitry to prevent sensing of the synchronization label during operation of the scanner to sense the bar code labels on products to be scanned, the filtering circuitry being operative to allow sensing of the synchronization label solely during startup and initialization of the scanner.

3. The bar code scanner of claim 2 further comprising a pulse producing device associated with the motor, the pulse producing device producing a predetermined number of pulses at each rotation of the motor, the pulses occurring at equally spaced intervals, each pulse indicating a degree of angular rotation of the motor.

4. The bar code scanner of claim 3 wherein the position detector further comprises a pulse detector for detecting pulses produced by the pulse producing device.

5. The bar code scanner of claim 4 wherein the position detector further comprises also includes a pulse counter for counting the pulses produced by the pulse producing device and maintaining a pulse count, and a processor for converting the pulse count maintained by the pulse counter into a degree of angular rotation of the motor.

6. The bar code scanner of claim 5 wherein the position detector further comprises a timer for maintaining the time of bar code scans.

7. A method of initializing and monitoring the position of an optical assembly of a bar code scanner, comprising the steps of:

directing light through a rotating optical assembly, the optical assembly being rotated by a motor, the motor having an associated pulse producing device, the light being directed such that the light will strike a synchronization label attached to the bar code scanner when the optical assembly is at a known rotational angle;

when the light from the optical assembly strikes the synchronization label, receiving the light reflected from the synchronization label and identifying the light as coming from the synchronization label;

initializing the position of the optical assembly as the angular position of the synchronization label;

continuing to monitor the pulse count to determine a continuously updated angular position of the optical assembly with respect to the initial position; and when an event of interest occurs, determining the angular position of the optical assembly at the occurrence of the event of interest by determining an offset of the pulse count at the event of interest from the pulse count at the initial position of the optical assembly.

8. The method of claim 7 further comprising, before the step of directing light, the step of:

opening an optical filter to allow receipt of initialization data.

9. The method of claim 7 wherein:

the associated pulse producing device produces pulses at regularly spaced intervals when the motor is operating at substantially constant speed.

10. The method of claim 7 wherein the step of initializing the position further includes the substep of:

determining a first motor angle position.

11. The method of claim 10 wherein the step of determining the angular position further comprises the substep of:

determining a second motor angle position when the event of interest occurs.

12. The method of claim 11 wherein the step of determining the angular position further comprises the substep of:

comparing the first motor angle position to the second motor angle position.

13. The method of claim 7 wherein:

the synchronization label is affixed to the bar code scanner at a predetermined location.

14. The method of claim 7 wherein:

the event of interest is a scan of a bar code label affixed to an item.

15. A bar code scanner comprising:

a laser;

an optical assembly having a spinner, the optical assembly being operative to conduct light transmitted by the laser and receive light reflected back from a surface;

a motor attached to the spinner, the motor being operative to rotate the optical assembly and produce a motor pulse signal;

a synchronization label attached to the bar code scanner and held at a fixed position and operable to receive and reflect light from the laser when the spinner is at a predetermined angular position; and a position detector for:
determining a first angular position of the motor when the spinner is at the predetermined angular position;
monitoring the motor pulse signal to determine a number of motor pulses produced;
determining a second angular position of the motor when an event of interest occurs based on the number of motor pulses produced; and
determining an angular position of the spinner from the second angular position of the motor.

16. The bar code scanner of claim 15 wherein the position detector is further for calculating an origin and a direction of light emitted from the spinner.

17. The bar code scanner of claim 15 wherein the position detector further comprises a timer for maintaining a time of bar code scans.

* * * * *